United States Patent
Hopkins

(10) Patent No.: US 7,370,524 B2
(45) Date of Patent: May 13, 2008

(54) ADAPTIVE VIBRATION CONTROL USING SYNCHRONOUS DEMODULATION WITH MACHINE TOOL CONTROLLER MOTOR COMMUTATION

(75) Inventor: David James Hopkins, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 89 days.

(21) Appl. No.: 11/205,551

(22) Filed: Aug. 15, 2005

(65) Prior Publication Data
US 2006/0036351 A1    Feb. 16, 2006

Related U.S. Application Data

(60) Provisional application No. 60/601,205, filed on Aug. 13, 2004, provisional application No. 60/602,079, filed on Aug. 16, 2004.

(51) Int. Cl.
  *G01M 1/16* (2006.01)
(52) U.S. Cl. ........................ 73/146.2; 73/462
(58) Field of Classification Search ................ 73/430, 73/457, 460, 462
See application file for complete search history.

(56) References Cited

U.S. PATENT DOCUMENTS

| | | | |
|---|---|---|---|
| 4,464,935 A | * | 8/1984 | McHugh ...................... 73/660 |
| 5,369,348 A | | 11/1994 | Gennesseaux ............... 318/623 |
| 5,796,002 A | | 8/1998 | Layton ..................... 73/504.16 |
| 6,140,790 A | * | 10/2000 | Heine et al. ................. 318/611 |
| 6,402,089 B1 | | 6/2002 | Kiss et al. ............... 244/17.27 |
| 2003/0050716 A1 | | 3/2003 | Helland ........................ 700/63 |
| 2004/0154413 A1 | | 8/2004 | Coy et al. .............. 73/862.453 |

* cited by examiner

Primary Examiner—Hezron Williams
Assistant Examiner—Tamiko Bellamy
(74) Attorney, Agent, or Firm—James S. Tak; John H. Lee

(57) ABSTRACT

A control system and method for actively reducing vibration in a spindle housing caused by unbalance forces on a rotating spindle, by measuring the force-induced spindle-housing motion, determining control signals based on synchronous demodulation, and provide compensation for the measured displacement to cancel or otherwise reduce or attenuate the vibration. In particular, the synchronous demodulation technique is performed to recover a measured spindle housing displacement signal related only to the rotation of a machine tool spindle, and consequently rejects measured displacement not related to spindle motion or synchronous to a cycle of revolution. Furthermore, the controller actuates at least one voice-coil (VC) motor, to cancel the original force-induced motion, and adapts the magnitude of voice coil signal until this measured displacement signal is brought to a null. In order to adjust the signal to a null, it must have the correct phase relative to the spindle angle. The feedback phase signal is used to adjust a common (to both outputs) commutation offset register (offset relative to spindle encoder angle) to force the feedback phase signal output to a null. Once both of these feedback signals are null, the system is compensating properly for the spindle-induced motion.

5 Claims, 3 Drawing Sheets

ADAPTIVE VIBRATION CONTROL USING SYNCHRONOUS DEMODULATION WITH MACHINE TOOL CONTROLLER MOTOR COMMUTATION

I. CLAIM OF PRIORITY IN PROVISIONAL APPLICATION

This application claims priority in provisional application No. 60/601,205 filed on Aug. 13, 2004, and provisional application No. 60/602,079 filed on Aug. 16, 2004, both entitled "Adaptive Control Using Synchronous Demodulation with Machine Tool Controller Motor Commutation," and both by David James Hopkins.

The United States Government has rights in this invention pursuant to Contract No. W-7405-ENG48 between the United States Department of Energy and the University of California for the operation of Lawrence Livermore National Laboratory.

II. FIELD OF THE INVENTION

The present invention relates to vibration dampening systems and more particularly to a system and method of isolating an unbalanced machine spindle by actively dampening spindle housing vibration using synchronous demodulation of the vibration/displacement signal with machine tool controller motor commutation.

III. BACKGROUND OF THE INVENTION

Proper configurations of controls, sensors, and metrology technologies have enabled precision machines to achieve nanometer positioning. However, at this level of positioning resolution, vibration sources can become a limiting factor. One of the largest sources of vibration in, for example, a precision turning machine is an unbalanced rotating spindle, creating a rotating force vector with a once per revolution period. The cause and size of such an unbalance force is typically a function of the spindle, the part, the part fixturing, the part setup, and the spindle speed. For example, the magnitude of the unbalance force increases as the square of the spindle speed. In addition, certain spindle speeds coupled with the size of the unbalance force can contain other harmonics that may excite machine structural resonances.

For example, spindle unbalance forces in a precision machine can impart energy into the machine base and provide a forcing function to the machine slides and the machine metrology frame, and may cause undesirable slide motion. This motion can be rejected to some extent by the control system loop gain but the loop gain decreases with increasing frequency. This is the opposite of what is desired as the unbalance spindle forces increase with spindle speed (frequency) to further compound the problem. Force disturbance of the metrology frame can cause non-rigid body motion of the frame and distort the measure tool position. Canceling or otherwise attenuating the spindle unbalance force reduces these error sources.

It is also appreciated that synchronous demodulation is a well known technique to recover a synchronous signal in the presence of noise or non-synchronous interfering signals. It is in essence a process that results in a high Q filter. The desired signal is modulated onto a carrier signal where it can be signal conditioned. After conditioning, the carrier is then demodulated by a phase sensitive detector and sent to a low pass filter to recover the desired conditioned signal. Synchronous demodulation works because the input carrier signal is synchronous to a reference signal applied to a phase sensitive detector. Because the detector is sensitive to phase, the low pass filter output can be bipolar. The detector output follows the equation: A[cosine (phase of input signal—phase of the detector reference signal)], where A is the amplitude of the detector input. The detector gain is a maximum when the phase of the input signal and the reference signal are the same or 180 degrees out of phase. And the detector gain is a minimum when the phase difference between the input signal and the reference signal is 90 degrees.

Ideally, the solution is to cancel the unbalance force at the source or rotor of the spindle. This is difficult, however, since the rotor must hold the part and any apparatus that would be used to cancel the rotor unbalance. There is therefore a need for an method and system for reducing the spindle housing vibration in a feedback process utilizing synchronous demodulation using the inherent commutation functions available on a typical servo controller.

IV. SUMMARY OF THE INVENTION

One aspect of the present invention includes a control system for dampening spindle housing vibration induced by an unbalanced rotating spindle, comprising: an angular position sensor for sensing the angular position of the rotating spindle; at least one displacement sensor(s) for measuring displacements associated with the spindle housing vibration; means for exerting a mechanical dampening force on the spindle housing in the measurement direction(s) of the at least one displacement sensor(s); and a controller capable of synchronously demodulating a displacement measurement with respect to an angular position measurement of the spindle to determine the magnitude and location of a maximum unbalance signal, and controlling the mechanical dampening force exerting means based on said magnitude and location of the maximum unbalance signal so as to actively dampen the spindle housing vibration.

Another aspect of the present invention includes a control system for reducing spindle housing vibration induced by an unbalanced rotating spindle, comprising: an angular position sensor for sensing the angular position of the rotating spindle; at least one displacement sensor(s) for measuring displacements associated with the spindle housing vibration; means for exerting a mechanical dampening force on the spindle housing in the measurement direction(s) of the at least one displacement sensor(s); a first controller module capable of synchronously demodulating a displacement measurement with respect to an angular position measurement of the spindle to produce a first demodulated output, and a second demodulated output which is 90 degrees out of phase from the first demodulated output; a second controller module capable of filtering the first and second demodulated outputs to produce a magnitude of phase error correction associated with the first demodulated output, and a magnitude of amplitude error correction of the displacement measurement corresponding to the second demodulated output; a third controller module capable of using the magnitude of amplitude error correction as input for demodulating said input with respect to the angular position measurement of the spindle; a fourth controller module capable of recursively adjusting the angular position measurement of the spindle used by the first and third controller modules so that the magnitude of phase error correction is reduced to zero, and a fifth controller module capable of producing a signal for actuating the means for exerting a mechanical dampening force on the spindle housing to reduce the vibrations on said spindle housing.

Another aspect of the present invention includes a control method for dampening spindle housing vibration induced by an unbalanced rotating spindle, comprising: using an angular position sensor for sensing the angular position of the rotating spindle; using at least one displacement sensor(s) for measuring displacements associated with the spindle housing vibration; synchronously demodulating a displacement measurement with respect to an angular position measurement of the spindle to determine the magnitude and location of a maximum unbalance signal; and controlling a mechanical dampening force exerting means on the spindle housing based on said magnitude and location of the maximum unbalance signal so as to actively dampen the spindle housing vibration.

V. BRIEF DESCRIPTION OF THE DRAWINGS

The accompanying drawings, which are incorporated into and form a part of the disclosure, are as follows.

VI. DETAILED DESCRIPTION

Figure 1:
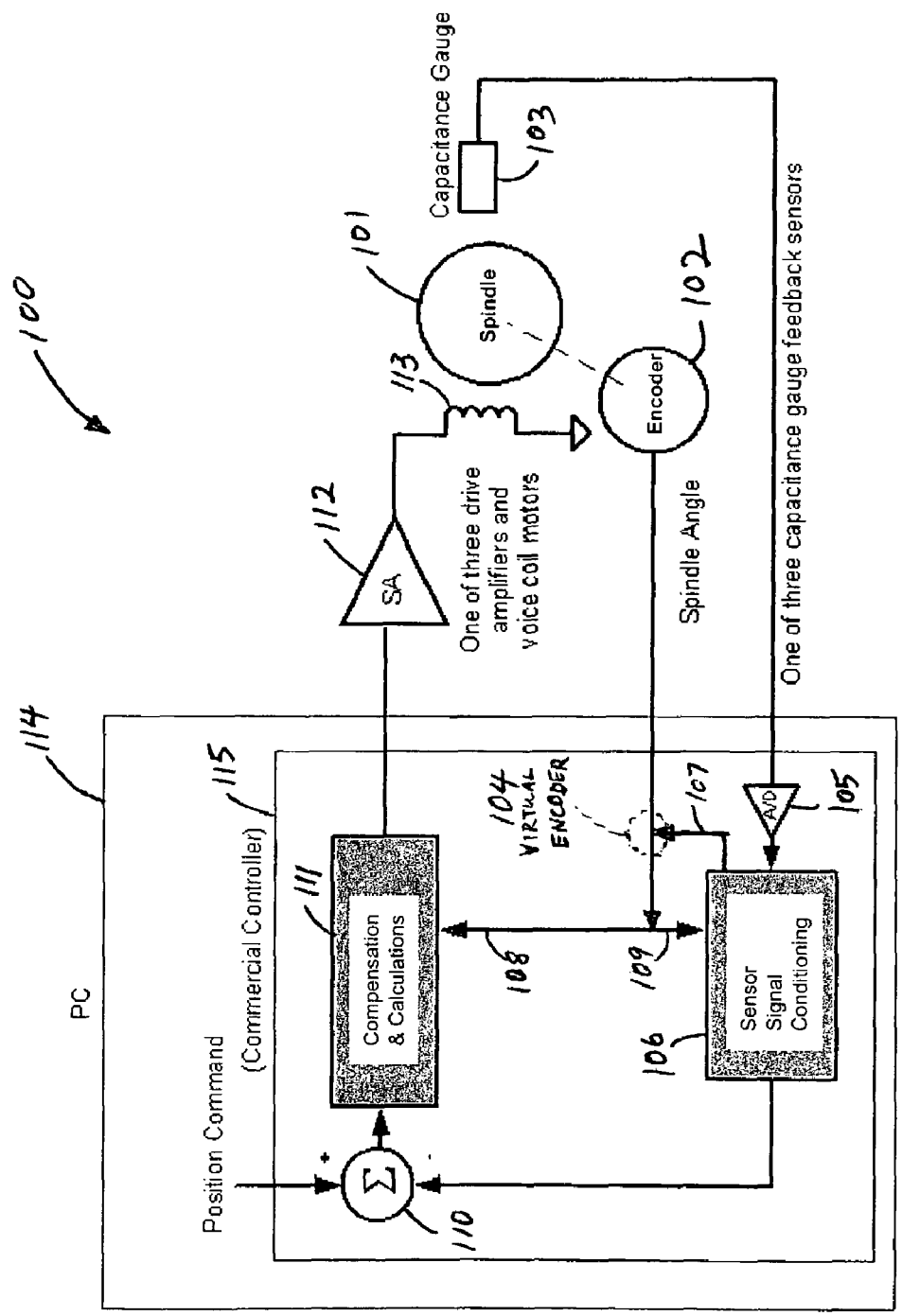
FIG. 1 is a general block diagram of an exemplary embodiment of the control system of the present invention.

Generally, the present invention is a control system and method for actively dampening, canceling, attenuating, or otherwise reducing vibration in a spindle housing caused by unbalance forces on a rotating spindle so that these forces do not disturb other sensitive machine systems, e.g. the slide servo system or the machine metrology frame. The system and method of the present invention operates to monitor and measure the force-induced spindle-housing motion, determine control signals based on synchronous demodulation, and provide compensation for the measured displacement to cancel or otherwise reduce or attenuate the vibration. In particular, the synchronous demodulation technique is used in the present invention to recover a measured machine displacement signal related only to the rotation of a machine tool spindle, and consequently reject measured displacement not related to spindle motion or synchronous to a cycle of revolution. Furthermore, the controller preferably actuates a voice-coil (VC) motor, canceling the original force-induced motion. The amount of force required to cancel the unbalance spindle force is a function of frequency (spindle speed), the amount of (inertial) mass the VC is moving, and the range of VC travel. It is notable that the system of the present invention preferably controls three degrees of freedom of spindle housing motion so that the displacement induced by the unbalanced forces is held to nanometer levels (sensor dependent) regardless of the spindle speed or changes in the part contour, and it adapts in real time to changes in unbalance forces. They include: (1) the x direction (a single VC motor); the y direction (two y VC motors acting together); and rotationally, the yaw motion (two y VC motors acting in opposition), and adapts the magnitude of voice coil signal until this measured displacement signal is brought to a null. More particularly, in order to adjust the signal to a null, it must have the correct phase relative to the spindle angle. The feedback phase signal is used to adjust a common (to both outputs) commutation offset register (offset relative to spindle encoder angle) to force the feedback phase signal output to a null. Once both of these feedback signals are null, the system is compensating properly for the spindle-induced motion. Because of the control system, the system adapts to changes in spindle speed or the magnitude of the unbalance. In any case, the system has the ability to adapt in real time to remove the fundamental component of the unbalance rotational force vector to nanometer levels.

The control algorithm of the present invention is preferably implemented on a commercially available controller to perform synchronous demodulation using the built-in commutation features available therein for brushless motors, and is sensitive only to unbalance induced motion (i.e. motion which is induced by an unbalance). Many modern day machine tool controllers provide the ability to perform sinusoidal commutation for brushless motors. Such a controller accepts encoder feedback from the motor and uses the encoder input to generate sinusoidal signals that modulate the torque command signals for the multi-phase input of a brushless motor amplifier. And such a controller has several motor axes that can be individually commutated. In particular, when a machine tool controller commutates a brushless motor, it uses a sensor (typically an encoder) to sense the location of the motor rotor and modulates the torque command (motor current) in each of the motor phases (i.e. "and modulates the servo output signals delivered to the torque amplifier (motor current command) for each motor phase"). The "torque command" (i.e. the signals of the two output phases (the PID output or $2^{nd}$ order filter output—Actuator Excitation—see FIG. 2)) is modulated (commutated) in many modern day [machine tool] controllers with a sinusoid, the value of which depends on the angular position of the encoder. This is typically done by using a lookup table of a specified size, perhaps 2048 locations corresponding to 360 degrees of motor rotation. At each location is the value of the sine of the motor rotor angle. For example, if the encoder is at count 205, the rotor would be at an angle of 360*205/2048 or approximately 36 degrees. At the memory location 205 the sine of the angle of 36 degrees can be found. The first phase of a multiphase motor would be modulated with the torque command times the sine of 36 degrees. Most brushless motors are either two or three phase devices. The offset commutation angle between the first and second phase is either 90 degrees for a two phase device, or 120 degrees for a three phase device. There is an additional table and output that is used to modulate the torque command for this second motor phase. For example, for a three phase motor, using the same angle of the rotor, the second phase of the motor is modulated with the torque command times the sine of the angle of 36 degrees plus 120 degrees (sin(156 degrees)). If 90 degrees is chosen as the phase offset, e.g. for a two phase brushless motor, the torque command is modulated by the sine and the cosine (sin (0+90)) of the motor rotor angle.

Figure 2:
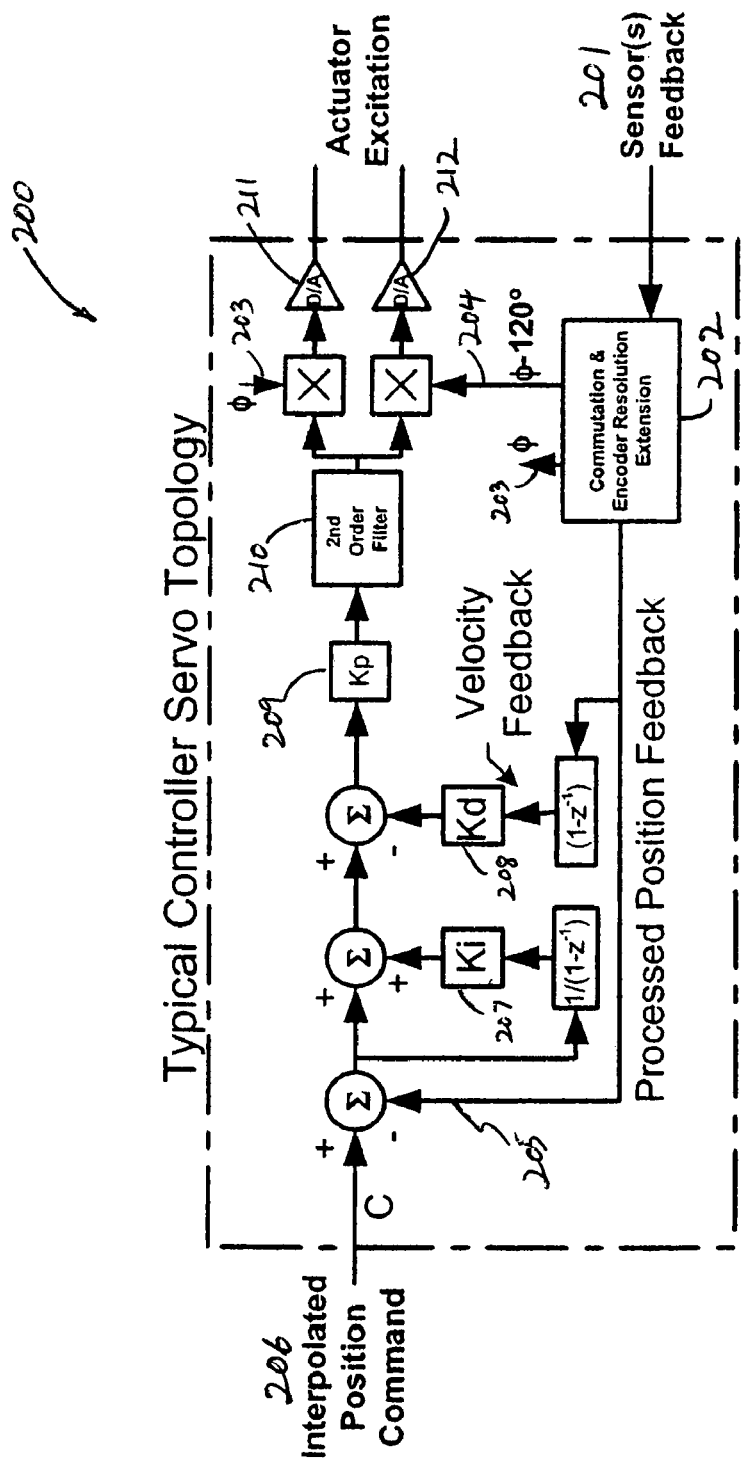
FIG. 2 is a typical controller servo topology known in the art, which may be modified for use with the present invention.

Turning now to the drawings, FIG. 2 shows a typical configuration of a single axis servo actuator topology 200 of a typical multi-axis machine tool controller known in the art, which in a preferred embodiment is modified for use with the present invention. The sensor feedback, shown at reference character 201, is typically the linear scale of a linear axis or a rotary encoder of a rotary axis. And the actuator output 203 and 204 comprises two signals displaced 120 degrees apart (φ and φ−120) used to drive a corresponding torque amplifier (e.g. 211, 213) of a three phase brushless motor. It is notable that while only two phases are shown, represented by the torque amplifiers 211 and 213, the third phase is derived in the amplifier of the servo actuator from these two signals ($\phi$ and $\phi-120$). The sensor feedback 201, which is the encoder or scale input, can be interpolated for greater resolution at 202 and this becomes the processed position feedback, indicated at arrow 205. From the sensor feedback 201 and the motor commutation period (known for a commercial controller), the controller can generate a sinusoidal modulation of the two output signals. This is done by multiplying the torque command at the $2^{nd}$ order filter 210 output by the two sinusoidal signals generated by the controller commutation algorithm, indicated as 202. The interpolated position command 206 is updated at each servo update of the controller. The controller allows typical PID servo control of the output signal(s). This is the Kp, Ki, and Kd terms, indicated at reference characters 207, 208, and 209, respectively. In addition, the second order filter 210 is provided to address more complex servo dynamics. It is appreciated that while the sensor signal and the commutation algorithm are typically derived from the same device (an encoder), this is not a requirement. It is appreciated that the processed position and the commutation algorithm can be derived from two separate sources. In addition, several axes (i.e. different servo actuators) can be commutated from the same encoder. It is these features of the controller that contribute to allowing synchronous demodulation of an input signal by the controller, as implemented by the present invention.

A displacement sensor, e.g. capacitance gauge, that observes motion caused by rotor/motor rotation (due to an unbalance force) and perhaps contaminated with other synchronous and non-synchronous displacement signals is passed through the commutation function, the sensor signal is synchronously demodulated with respect to the encoder. By picking a 90 degree offset for the two phases of commutation, the output will be Fourier transform of the measured displacement signal. (Sine of the encoder angle times the input signal is available at one output and the cosine of the encoder angle times the input signal is available at the other output.) Once these signals are low pass filtered, a coefficient for each of two outputs is available that represents only the synchronous value of the sensor signal. Because of the Fourier transform, any input signal not related to the once per revolution of the rotor are rejected by the transform (it is a selective filter). It can also be considered a two phase synchronous demodulator. When used as part of a control system that adjusts the reference phase (relative to the zero point of the encoder), the sine output represents the magnitude of the input signal and the cosine represents the amount of phase adjustment needed to obtain the maximum signal gain for the sine signal. This is the key to the adaptation aspects of the present system. The control system tries to adjust the cosine signal term to a minimum or zero and the sine signal term to a maximum.

To be more specific, assume a displacement sensor is observing motion caused by an unbalance force acting on the structure induced by the spindle and motor of this system. Initially, the maximum amplitude of the displacement signal may not necessarily correlate to the sine and cosine commutation angle due to the angular position of the encoder versus the angular position of the unbalance. Because of the dual synchronous demodulation, it is possible to find the maximum unbalance signal and the location of this signal relative to the encoder zero. When there is an offset between the encoder commutation angle and the peak of the unbalance signal, the sine output will have less than the maximum signal and the cosine output will have more than a zero or minimum output. If the cosine value is used in a control system to adjust a simulated encoder reference or virtual encoder, the adjustment continues until the cosine signal magnitude is zero. At this point, the maximum synchronously demodulated signal is obtained at the first phase output or sine output. Once this signal is low pass filtered, a DC value is obtained representing the peak of the displacement signal at the maximum unbalance location. This signal can now be used as a command or torque input command to actuate a second motor axis that may drive an actuator to cancel the synchronous motion detected by the displacement sensor.

FIG. 1 shows a general flow chart of the control system of the present invention, generally indicated at reference character 100, for controlling a spindle, shown together with the spindle housing as 101 in FIG. 1. A displacement sensor 103, such as but not limited to a capacitance gauge, is shown adjacent the spindle housing 101 to measure displacement thereof, with the displacement sensor referenced to a machine base to which the spindle and housing is mounted (not shown). The measured displacement is sinusoidal due to an unbalance force on the spindle. And generally, the measured displacement corresponds to the motion profile required of a controllable displacement compensation device, such as a voice coil (VC) motor, represented by 113 in FIG. 1. Additionally, an encoder 102 is shown which functions to measure the spindle angle, i.e. the angular position of the spindle relative to a zero reference point. Together, the displacement measurement from the displacement sensor 103, and the spindle angle measurement from the encoder 102 is fed to a controller, generally indicated at 115, running the control method and algorithm of the present invention. For the displacement sensor measurement and A/D converter 105 is shown for converting the analog signal to a digital signal before provided to block 106. And as shown in FIG. 1, the controller is itself controlled by, for example, a computer processor or PC, 114, where for example a position command may be generated to control operation of the controller 115. The controller 115 is preferably a commercial controller having built-in functions used by the present invention to perform synchronous demodulation. In any case, conditioning of the sensor signal occurs in block 106. Specifically, block 106 performs synchronous demodulation of the sensor signal from the displacement sensor with respect to the angular position signal 109 of the spindle from the encoder 102. Furthermore, as indicated by arrow 107, a loop is provided to update the signal coming from the encoder with one which drives the phase error to zero (not shown), as will be described in greater detail below. As such, the angular position signal sent to block 111 via arrow 108 and to block 106 via arrow 109, can be described as generated by a "virtual encoder" indicated at 104. In any case a conditioned signal (i.e. a signal representing the magnitude of amplitude error correction of the displacement signal) is transmitted to block 110 where it is summed with a position command, which is set to zero, and therefore passed into block 111 where calculations are performed to generate compensation signals to drive the controllable displacement compensation device. In particular, a servo amplifier 112 is shown controlled by block 111 to drive the, for example, VC motor 113. While only one displacement sensor is shown, it is appreciated that two or more sensors may be postioned to monitor various degrees of freedom and motion of the spindle housing. In a preferred embodiment, three degrees of freedom are monitored and controlled using. . .

As shown in FIG. 1, the signal from the displacement sensor is directly sent to the commutation algorithm of an axis (i.e. a single level of control in a multi-axis/level controller). Each axis is commutated by the spindle encoder, but the commutation for each of the multi-phase outputs of an axis is offset by 90 degrees. This provides a demodulated output signal proportional to displacement on one output (the sine modulated output) and a demodulated output signal proportional to phase on the outer output (the cosine modulated output). These demodulated signals are then low pass filtered by the controller. The filtered outputs now represent the measured displacement and phase relative to the spindle angle. These low pass filtered outputs can now be used as feedback for a control system. These sensor-derived measurements are made on a real time bases. In this system, spindle rotationally induced motion (normally an unbalance) is canceled by a voice coil (VC) motor moving a known inertial mass.

In the present invention, the torque command discussed above is instead replaced by a signal from an external sensor and this signal is commutated from the encoder, so that the sensor signal is synchronously demodulated. The input signal (sensor signal in FIG. 1) is the displacement sensor measuring the motion of the structure caused by the spindle/motor as discussed above. The reference signal for the synchronous demodulation (the commutation algorithm) is the encoder tied to the motor rotor of the spindle. The commutation algorithm is set for a 90 degree offset between two outputs instead of the 120 degrees as shown in FIG. 1. By setting the interpolated position command input to zero, the Kp term to a gain of one, the Kd term to a gain of zero, the Ki term to a gain of zero, the second order filter to a gain of one, the processed position command (the sensor input signal) is multiplied by the sine of the angle of the encoder at the first output and the cosine of the angle of the encoder at the second output. This multiplication performs the synchronous demodulation at the two outputs of the input signal relative to the rotary encoder. By low pass filtering these outputs, the coefficient of the amplitude and phase of the displacement signal can be determined.

Figure 3:
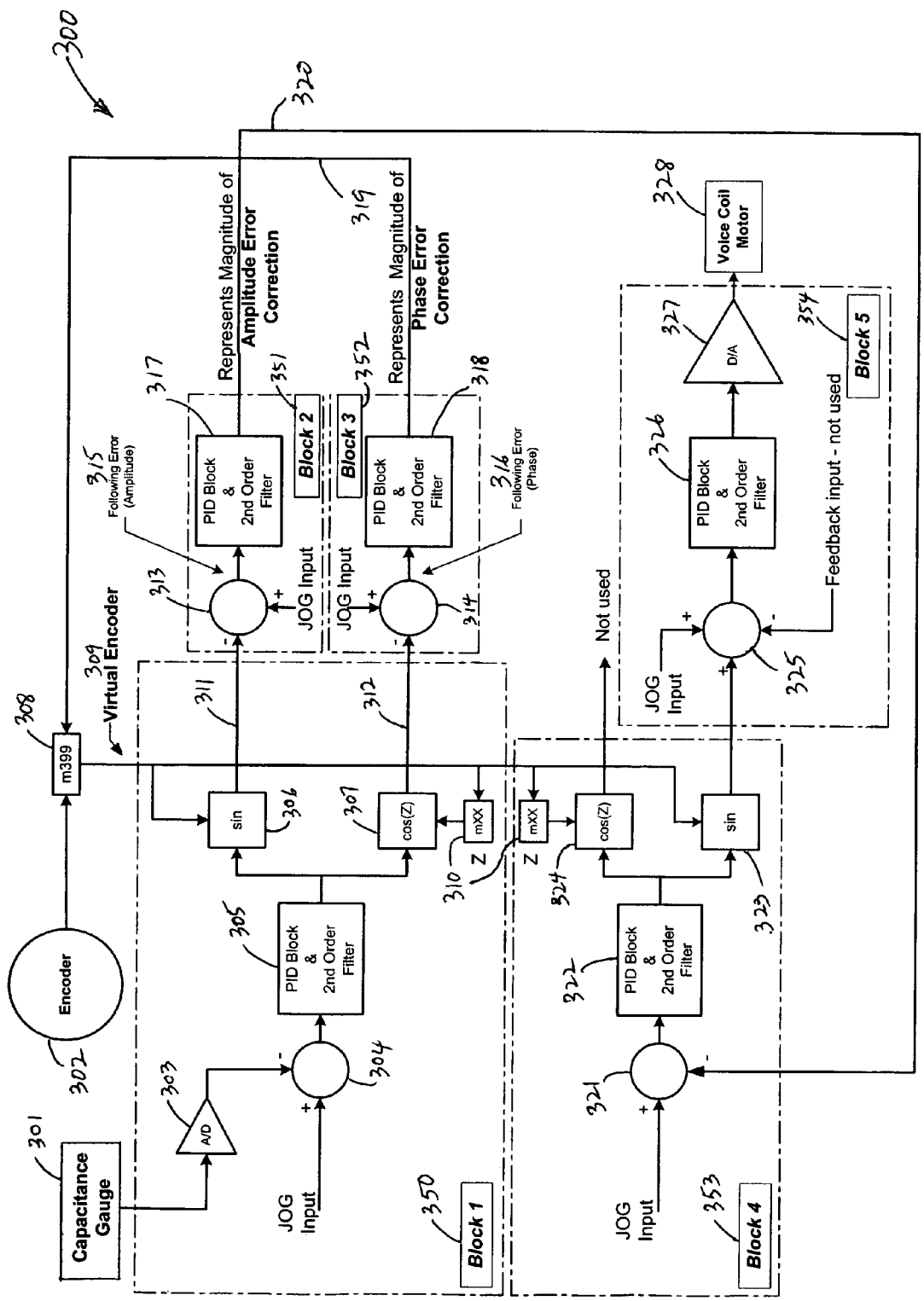
FIG. 3 is a detailed block diagram of the control system of the present invention illustrating the flow of signals and control between various blocks of the present invention.

The complete control algorithm is shown in FIG. 3. Each dotted outline represents a Block or axis of the machine controller as shown in FIG. 1. Blocks 1 and 4 have commutation enabled, and Blocks 2, 3, and 5 have commutation disabled. The input signal from the capacitance gauge sensor is an analog signal representing displacement. Block 1 performs the dual synchronous demodulation of this displacement signal as previously described. The mXX register 310 in Blocks 1 and 4 is the phase angle offset between the two commutation outputs, and is set to 90 degrees to provide the sine and cosine multiplying values for the commutation (synchronous demodulation) of the displacement signal. The two synchronously demodulated outputs of Block 1 are filtered by a controller filter function (not shown) typically built into Block 2 and Block 3 (the sensor input is filtered before becoming the processed feedback input—see FIG. 2). Blocks 2 and 3 respectively provide the servo compensation for the two control loops. The JOG input of Block 2 and 3 are normally set to zero and can be thought of as a DC offset to the filtered signals. If the following error i.e. filtered output or error signal, is zero for the cosine path, the phase of the imbalance has been properly determined. If the following error, i.e. filtered output, of the sine path is zero, the imbalance has been effectively canceled by the voice coil forcer shown at the output of Block 5.

Block 4 uses the sine output to generate a sinusoidal command signal to block 5 based on the amplitude of Block 2. Block 1 and 4 uses the virtual encoder (offset register label m399) developed from the sum of the actual encoder count and a count value derived from the output magnitude of Block 3. The count value derived from the output magnitude of Block 3 (i.e. the filtered cosine output signal from Block 3) is part of a feedback loop that adjusts the offset phase register m399. This adjustment continues until the following error (i.e. filtered cosine output) at Block 3 reaches zero. When this occurs the virtual encoder phase is lined up with the maximum angular location of the unbalance. The filtered sine output is now at a maximum and through feedback, the value of this signal is now used by Block 4 to generate a harmonically clean sine signal whose amplitude will force the voice coil motion to produce zero at the filtered sine path input of Block 2. When this happens, the unbalanced displacement is exactly canceled by the voice coil actuator. Only the synchronous signal components of the once per revolution of the motor are observed as the commutation is set for one cycle per revolution. Note that the cycles per revolution can be changed to observe harmonics of the sensor signal. Harmonic synchronous demodulation is easily done by the controller as brushless motors typically have several motor pole pairs requiring several electrical cycles for one full motor rotation. And the time constants of the control algorithm are much greater than 60 seconds divided by the spindle motor RPM so the system adapts slowly to changes in the spindle speed or unbalance.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

I claim:

1. A control system for dampening spindle housing vibration induced by an unbalanced rotating spindle, comprising:
   an angular position sensor for sensing the rotary angular position of the spindle rotating about its spindle axis;
   at least one displacement sensor(s) for measuring displacements associated with the spindle housing vibration;
   means for exerting a mechanical dampening force on the spindle housing in the measurement direction(s) of the at least one displacement sensor(s); and
   a controller capable of synchronously demodulating a displacement measurement with respect to a rotary angular position measurement of the spindle to determine the magnitude and location of a maximum unbalance signal, and controlling the mechanical dampening force exerting means based on said magnitude and location of the maximum unbalance signal so as to actively dampen the spindle housing vibration.

2. The system of claim 1,
   wherein three displacement sensors are used to measure displacements of the spindle housing, with a first sensor positioned to measure displacement in an x-direction, and second and third sensors positioned opposite each other to measure displacement in a y-direction
   and the means for exerting a mechanical dampening force on the spindle housing comprises three voice coil motors, each positioned opposite a corresponding one of the three displacement sensors.

3. The system of claim 2,
   wherein the second and third sensors, and their corresponding voice coil motors, are offset from each other for sensing and controlling s rotational displacements of the spindle housing.

4. A control system for reducing spindle housing vibration induced by an unbalanced rotating spindle, comprising:
- an angular position sensor for sensing the angular position of the rotating spindle;
- at least one displacement sensor(s) for measuring displacements associated with the spindle housing vibration;
- means for exerting a mechanical dampening force on the spindle housing in the measurement direction(s) of the at least one displacement sensor(s); and
- a first controller module capable of synchronously demodulating a displacement measurement with respect to an angular position measurement of the spindle to produce a first demodulated output, and a second demodulated output which is 90 degrees out of phase from the first demodulated output;
- a second controller module capable of filtering the first and second demodulated outputs to produce a magnitude of phase error correction associated with the first demodulated output, and a magnitude of amplitude error correction of the displacement measurement corresponding to the second demodulated output;
- a third controller module capable of using the magnitude of amplitude error correction as input for demodulating said input with respect to the angular position measurement of the spindle;
- a fourth controller module capable of recursively adjusting the angular position measurement of the spindle used by the first and third controller modules so that the magnitude of phase error correction is reduced to zero, and
- a fifth controller module capable of producing a signal for actuating the means for exerting a mechanical dampening force on the spindle housing to reduce the vibrations on said spindle housing.

5. A control method for dampening spindle housing vibration induced by an unbalanced rotating spindle, comprising:
- using an angular position sensor for sensing the rotary angular position of the spindle rotating about its spindle axis;
- using at least one displacement sensor(s) for measuring displacements associated with the spindle housing vibration;
- synchronously demodulating a displacement measurement with respect to a rotary angular position measurement of the spindle to determine the magnitude and location of a maximum unbalance signal; and
- controlling a mechanical dampening force exerting means on the spindle housing based on said magnitude and location of the maximum unbalance signal so as to actively dampen the spindle housing vibration.

* * * * *